United States Patent

[11] 3,591,087

| [72] | Inventor | Remo Tontini<br>San Diego, Calif. |
|---|---|---|
| [21] | Appl. No. | 823,029 |
| [22] | Filed | May 8, 1969 |
| [45] | Patented | July 6, 1971 |
| [73] | Assignee | Rohr Corporation<br>Chula Vista, Calif. |

[54] APPARATUS FOR AUGMENTING THE THRUST OF AN AIRCRAFT JET ENGINE
4 Claims, 5 Drawing Figs.

[52] U.S. Cl. ......................................... 239/265.17,
  60/264, 60/39.52
[51] Int. Cl. ......................................... B64c 15/10
[50] Field of Search .................................. 239/127.1,
  265.11, 265.17, 265.19, 265.25, 265.27, 265.31,
  265.33; 60/264, 39.52, 39 C

[56] References Cited
UNITED STATES PATENTS

| 2,514,749 | 7/1950 | Dobbins | 60/264 X |
| 2,674,845 | 4/1954 | Pouchot | 60/264 X |
| 2,709,337 | 5/1955 | Markowski | 60/264 X |
| 2,943,444 | 7/1960 | Baxter | 239/265.17 |
| 3,041,825 | 7/1962 | Alford et al. | 239/265.25 |

FOREIGN PATENTS

| 569,189 | 1/1959 | Canada | 60/264 |

*Primary Examiner*—M. Henson Wood, Jr.
*Assistant Examiner*—John J. Love
*Attorney*—George E. Pearson ABSTRACT: The jetstream flowing through a tubular thrust ejector is prevented from detaching from the inner surface thereof by admitting a portion of the boundary layer of said jetstream into holes which terminate within an area encircling the aft portion of said inner surface and which communicate with the forward portion of the ejector throat.

PATENTED JUL 6 1971 3,591,087

INVENTOR.
BY REMO TONTINI
Edwin D. Grant
ATTORNEY

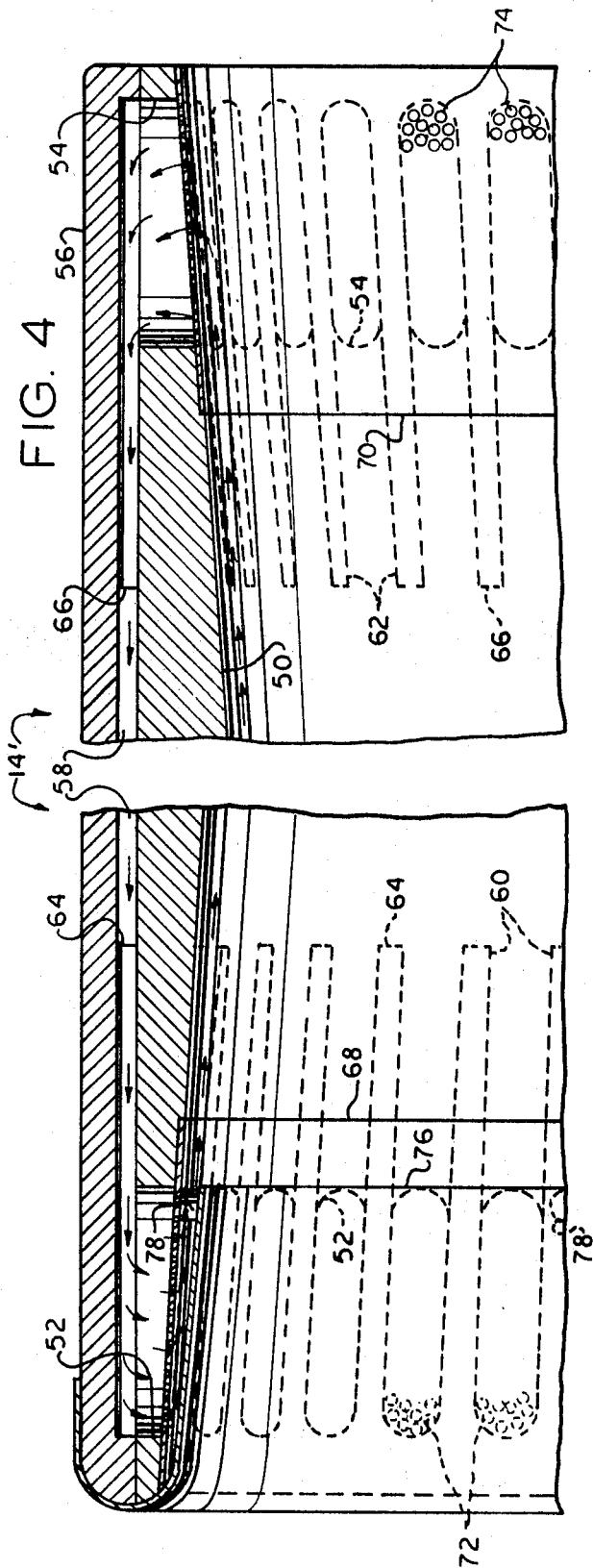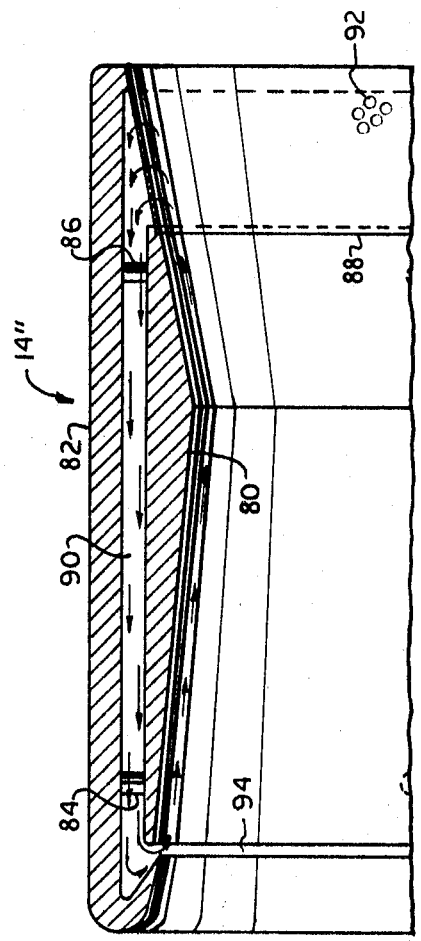

APPARATUS FOR AUGMENTING THE THRUST OF AN AIRCRAFT JET ENGINE

BACKGROUND OF THE INVENTION

This invention relates to jet propulsion and more particularly to an improved ejector construction and method for augmenting the thrust of a jet engine.

As is well-known, the thrust of a jet-propelled aircraft can be increased by positioning a tubular ejector downstream from an engine of the aircraft so that atmospheric air flows through the ejector along with the jet stream issuing from the engine. However, the efficiency of an ejector of the type utilized heretofore is reduced by the separation of the jetstream from the inner surface of the ejector at the aft end thereof, which separation is caused by the flow of atmospheric air along said inner surface in the direction opposite the flow of the jetstream.

SUMMARY OF THE INVENTION

In accordance with this invention, a portion of the boundary layer of the jetstream flowing through a tubular ejector is permitted to flow through holes located within the annular area on the inner surface of said ejector where flow separation normally occurs, the removed portion of the jetstream passing through a passage in the wall of the ejector to the forward end of said ejector where it is discharged into the jetstream around the periphery thereof. Thus separation of the jetstream from the aft portion of the throat of the ejector is prevented, and the thrust of a jet propulsion plant is increased without requiring additional power input thereto.

The method of augmenting the thrust of jet-propelled aircraft which is disclosed herein may be effected by various embodiments of the invention, in one of which a tubular ejector is suspended from and movable along a pylon extending rearwardly from an aircraft jet engine nacelle. The inner surface of the ejector has the form of a convergent-divergent nozzle, and the outer surface of the ejector has a shallow groove extending circumferentially thereof. A sleeve is abuttingly disposed around the ejector and extends over the aforesaid groove and is evenly spaced from the bottom surface thereof so as to provide an annular internal chamber in the wall of the ejector. A first set of holes extend from the forward portion of the inner surface of the ejector to the forward end of the aforesaid chamber, and a second set of holes extend from the aft portion of said inner surface to the aft end of said chamber. The holes in each of said sets are spaced apart both longitudinally and circumferentially of the ejector and are inclined toward the forward end of the nozzle. The holes at the aft end of the ejector are located at the point where flow separation of the jetstream from the ejector wall normally occurs. However, since the pressure at the aft portion of the ejector channel is greater than the pressure at the portion of said channel where the forward holes are located, a portion of the jetstream and atmospheric air entering the forward end of the ejector is drawn into the holes at the aft end of the latter and flows through the aforesaid chamber to the forward holes and back into the ejector channel. As a result of this pumping action, the stream of exhaust gas and atmospheric air flowing through the ejector channel remains attached to the inner surface of the ejector aft of the point where flow separation would occur in a conventional ejector of equivalent geometry.

In a modification of the aforedescribed embodiment of the invention, the holes at the forward end of the inner surface of the ejector are replaced by an annular opening which communicates with the forward end of the chamber in the ejector wall. Other embodiments of the invention may utilize porous panels which separate the aforesaid chamber from the jetstream flowing through the ejector but which permit flow of a portion of the boundary layer of the jetstream from the aft end of the ejector into the chamber and to the forward end of said ejector and back into the jetstream.

OBJECTS OF THE INVENTION

It is accordingly an object of this invention to provide a method of increasing the thrust of a jet engine by eliminating the separation of the jetstream thereof from the wall of an ejector used with said engine.

Another object of the invention is to provide an improved ejector for augmenting the thrust of a jet engine.

An additional object is to maintain the expansion boundary of a jet stream flowing through an ejector in contact with the aft portion of the inner surface of the latter.

Still another object is to provide a thrust augmenting ejector which utilizes the pressure gradient within the channel thereof to prevent separation of the jetstream flowing through said channel from the wall of the ejector.

DESCRIPTION OF THE DRAWINGS

In the drawings:

FIG. 4 is a longitudinal section of a modification of the ejector illustrated in FIG. 2, only one-half of said ejector being shown in order to simplify the drawing; and FIG. 5 is a longitudinal section of another modification of the ejector illustrated in FIG. 2, again only one-half of the ejector being shown in order to simplify the drawing.

Throughout the drawings and the following specification, the same numbers designate the same parts.

DETAILED DESCRIPTION

Figure 1:
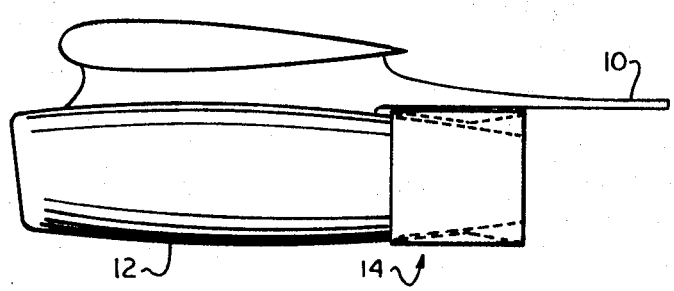
FIG. 1 is a side elevation of one embodiment of this invention, illustrating the ejector thereof in a stowed position wherein it is disposed around the aft end of a jet engine nacelle.

As illustrated in FIG. 1, one embodiment of this invention comprises a hollow pylon 10 one end of which is fixedly attached to a nacelle 12 containing an aircraft jet engine. The longitudinal axis of pylon 10 is parallel with the longitudinal axis of the thrust nozzle of the jet engine, which nozzle is substantially coterminous with the aft end of nacelle 12. Suspended from pylon 10 is a tubular ejector generally designated by the number 14. More specifically, a support member 16 (see FIGS. 2 and 3) is fixedly joined to the upper portion of the outer surface of ejector 14 and extends between the ends thereof, this member having a flat upper surface from which four arms 18 project. These arms are respectively disposed in pairs adjacent the forward and aft ends of support member 16 and, as can be seen in FIG. 3, each arm is spaced a short distance from a respective one of the longitudinally extending upper edges of said support member. Each arm 18 carries a roller 20 which engages the upper surface of a respective one of two flanges 22A, 22B which extend longitudinally of pylon 10 and which project inwardly from the lower edges of the sides thereof. The portions of the upper surface of member 16 disposed adjacent the longitudinal edges thereof slidably engage the lower surfaces of flanges 22A, 22B, respectively, and the sides of arms 18 slidably engage the end surfaces of said flanges, thus permitting movement of ejector 14 along pylon 10 while maintaining it in coaxial relation with the aforementioned thrust nozzle.

A motor 24 is fixedly positioned within the interior of pylon 10 at the forward end thereof. Mounted on the drive shaft 26 of this motor is a sprocket 28. Another sprocket 30 is rotatably mounted on a support arm 32 fixedly located within the interior of pylon 10 adjacent the aft end thereof, and a continuous drive chain 34 is engaged with the two sprockets and fixedly attached to a lug 36 which is integrally joined to the upper surface of support member 16 at the middle of ejector 14.

Figure 2:
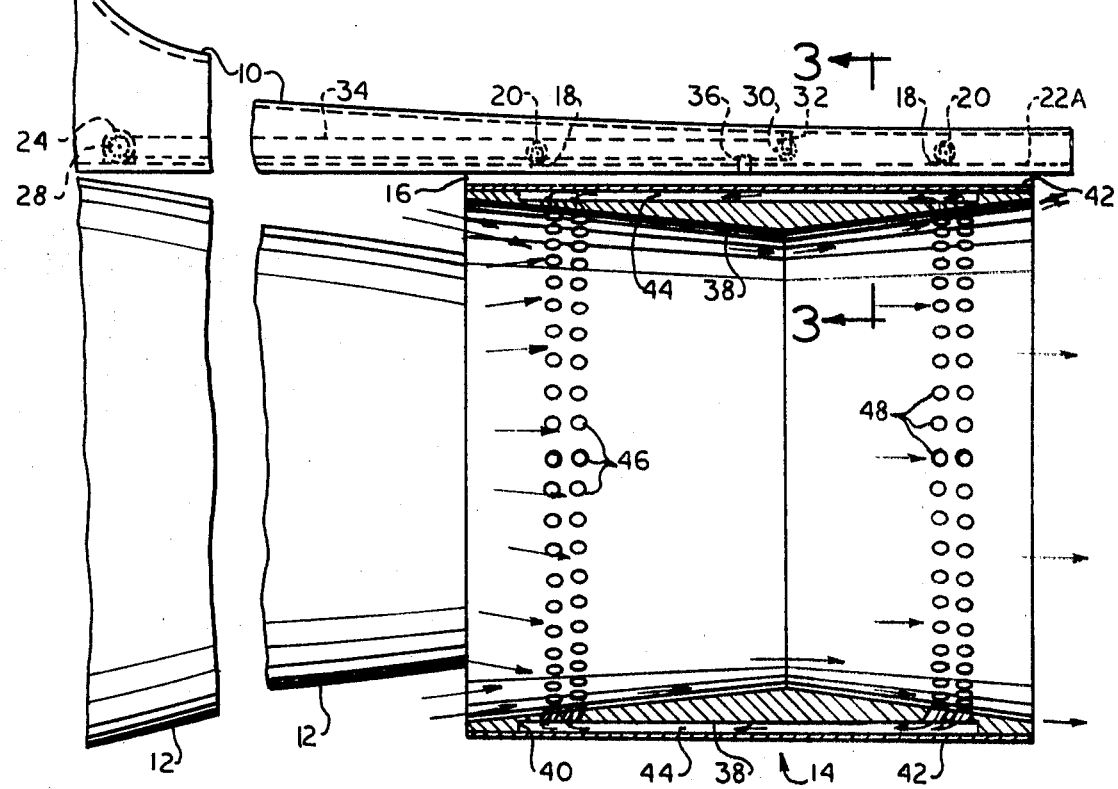
FIG. 2 is an enlarged side elevation of the same embodiment, the aforesaid ejector being illustrated in longitudinal section and in a deployed position downstream from the nacelle, and the latter and a pylon mounted thereon being illustrated in fragmentary form.
Figure 3:
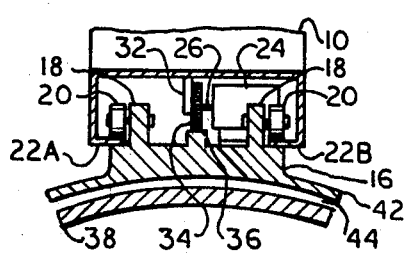
FIG. 3 is a detail cross sectional, fragmentary view of components of the same embodiment, taken along the plane represented by line 3-3 in FIG. 2 and in the direction indicated in the latter drawing.

As can be seen in FIG. 2, the wall of ejector 14 comprises a ring 38 the inner surface of which first converges in the downstream direction and then diverges so that the throat of the ejector is constricted between the ends thereof. Extending around the periphery of ring 38 is a recess 40 the forward and aft edges of which are respectively parallel with and located near the forward and aft edges of the ring. The wall of ejector 14 also comprises a sleeve 42 the inner surface of which abuts the outer surface of ring 38 and is fixedly positioned thereon in coterminous relation with the forward and aft edges thereof. Sleeve 42 is thus spaced from the bottom of the recess 40 in ring 38 and cooperates with the latter to provide an annular internal chamber 44 in the wall of the ejector. A first set of holes 46 extend through ring 38 at the forward end of chamber 44, and a second set of holes 48 extend through the ring at the aft end of the chamber. More explicitly, the holes in each set are arranged in two rows which extend around the inner surface of ejector 14, and the holes are evenly spaced apart in said rows with their longitudinal axes inclined toward the forward end of the ejector (i.e., the end of each hole 46, 48 which is at the inner surface of ring 38 is downstream from the end of the same hole which is at the bottom surface of the recess 40 in said ring). It will be understood that the number and diameter of the holes 46 and 48 in the inner surface of ejector 14 may be different from what is illustrated in FIG. 2.

A second embodiment of the invention which is illustrated in FIG. 4 differs from that previously described only with respect to the arrangement of the passages connecting the forward and aft ends of the ejector throat with the internal chamber in the wall thereof. More particularly, the ejector 14' which is illustrated in the last-mentioned drawing also comprises a ring 50 the inner surface of which first converges in the downstream direction and then diverges so that the throat of the ejector is constricted between the ends thereof. Extending through ring 50 and circumferentially spaced about the forward and aft ends thereof are a plurality of elongate holes 52, 54. A sleeve 56 is fixed in position against the outer surface of ring 50 and is formed with a recess 58 which extends around the inner surface thereof and with a plurality of slots 60, 62 which respectively extend from the forward and aft edges 64, 66 of this recess to points coterminous with the forward and aft ends of holes 52, 54 in ring 50. Perforate sleeves 68, 70 are respectively seated within grooves which circumscribe the forward and aft portions of the inner surface of ring 50, the perforations 72, 74 in these sleeves overlying holes 52, 54 respectively. The forward portion of an annular shield 76 abuts the forward edge of sleeve 56 and extends into the throat of ejector 14, the aft edge of this component being even with the aft ends of holes 52 in ring 50 and evenly spaced from sleeve 68 by means of a plurality of spacers 78 which are spaced apart circumferentially of said ejector.

The sleeves 68, 70 which are illustrated in FIG. 4 are made of metal bands in which perforations 72, 74 are formed by suitable means. However, these sleeves may be made of many different foraminous materials such as felt metal, high-strength ceramics, sintered metals, and the like.

FIG. 5 illustrates a third embodiment of the invention in which the ejector 14" comprises a ring 80 having a convergent-divergent inner surface, a sleeve 82 concentrically spaced around said ring and fixedly attached thereto by means of a plurality of struts 84, 86 respectively disposed at the forward and aft ends of the ring and spaced circumferentially thereof, and a sleeve 88 which is fixedly positioned across the aft end of the annular gap 90 between said ring and sleeve 82 and which is formed with a plurality of perforations 92. As can be seen in the drawing, the forward end of sleeve 82 is curved to provide an annular opening 94 which places the forward end of the aforesaid gap 90 in communication with the forward portion of the ejector throat, said opening being inclined so that its inner portion is forward of its outlet at the inner surface of the ejector.

Ejectors 14' and 14" may be suspended from a pylon 10 in the same manner as ejector 14 (see FIGS. 1 and 2), and may be deployed and retracted by the same type of drive system utilizing a drive motor 24 and drive chain 34.

OPERATION

It will be understood from the foregoing description that when thrust augmentation is required during the operation of the aircraft of which nacelle 12 is a part, motor 24 can be operated to rotate sprocket 28 in a counterclockwise direction as it is viewed in FIG. 2, whereupon drive chain 34 pulls ejector 14 (or ejectors 14' and 14" in the case of the embodiments illustrated in FIGS. 4 and 5) from its stowed position alongside nacelle 12 to its deployed position illustrated in the last-mentioned drawing. The operation of motor 24 is stopped by suitable means when the forward end of the ejector is disposed at the aft end of the nacelle, and thereafter atmospheric air flows into the ejector along with the jetstream discharged from the thrust nozzle at the aft end of the nacelle (as illustrated by arrows in FIG. 2). The stream of atmospheric air and exhaust gas passing through a conventional ejector separates from the inner surface of the latter at the point where the holes 48, 74, 92 are located in ejectors 14, 14', 14". Such flow separation results from the low pressure at the aft end of the passage in a conventional tubular ejector, which permits atmospheric air to enter said aft end of said passage and flow along the inner surface of the ejector in the direction opposite the flow of the main stream of atmospheric air and exhaust gas. However, in each ejector 14', 14" which has been described and illustrated a portion of the boundary layer of the jetstream flowing therethrough enters the holes 48, 74, 92 at the aft end thereof, passes through the annular gap between the inner ring 38, 50, 80 and outer sleeve 42, 56, 82 of the ejector, and flows through the holes 46, 72 or opening 94 at the forward end of said gap and back into the jetstream. This flow of gas and atmospheric air, illustrated by arrows in FIGS. 2, 4 and 5, causes the expansion boundary of the jet stream to remain attached to the aft portion of ejectors 14, 14', 14", and atmospheric air does not enter the aft end of the ejectors. The described flow of a portion of the boundary layer of the jetstream results from the pressure gradient along the inner surfaces of the ejectors, and thus is effected without requiring a source of external energy. Since the boundary of the stream of atmospheric air and exhaust gas remains attached to the aft portion of the inner surface of each ejector 14, 14', 14" as aforesaid, the thrust produced by the propulsion assembly of which the ejector is a part is greater than that of the same assembly equipped with a conventional ejector of the same size as said ejector 14. Conversely, an ejector constructed in accordance with this invention can have a shorter length than an ordinary ejector and still provide the same thrust augmentation as the larger ejector. By operation of motor 24 to turn sprocket 28 in a clockwise direction as it is viewed in FIG. 2, the ejector is returned to the stowed position when thrust augmentation is no longer required.

Although the invention has been described with reference to a particular embodiment of the same, it should not be considered to be limited thereto for various modifications could be made therein by one having ordinary skill in the art without departing from the spirit and scope of the invention as defined in the following claims. For example, a multiplicity of narrow slots may be substituted for holes 46, 48 in the embodiment of the invention illustrated in FIG. 2.

What I claim and desire to be secured by U.S. Letters Patent is:

1. A tubular thrust augmenting ejector for preventing detachment of the jetstream therewithin, said ejector having disposed therewithin a throat member which first converges in the downstream direction and then diverges so that the throat of said ejector is constricted between the ends thereof, said throat member having longitudinal slotted perforations therethrough adjacent the forward and aft end thereof and disposed circumferentially about the wall of said throat member, said ejector having a wall with at least one internal, longitudinally extending passage extending therethrough, said forward and aft slotted perforations having communications therebetween through said passage.

2. An ejector as defined in claim 1, wherein perforated sleeves are disposed respectively within the forward convergent and aft divergent portions of said throat member, said sleeves having a plurality of holes therethrough which overlay said slots of said throat member.

3. An ejector as defined in claim 2, wherein said holes are inclined relative to the longitudinal axis of said ejector so that their inner ends are forward of their outer ends.

4. An ejector as defined in claim 1, wherein sleeve sections constructed of porous material are disposed respectively within the forward convergent and aft divergent portions of said throat member.